US006091480A

United States Patent [19]

Vanous et al.

[11] Patent Number: 6,091,480

[45] Date of Patent: Jul. 18, 2000

[54] FILM REMOVAL MECHANISM FOR USE WITH A THERMAL DRUM PROCESSOR SYSTEM

[75] Inventors: James C. Vanous, Roseville; Paul C. Schubert, Marine-on-St. Croix; Arnold J. Alderman, Coon Rapids, all of Minn.

[73] Assignee: 3M Innovative Properties Company, St. Paul, Minn.

[21] Appl. No.: 08/895,619

[22] Filed: Jul. 17, 1997

[51] Int. Cl.[7] .......................... G03B 27/32; G03B 27/62

[52] U.S. Cl. .............................. 355/27; 355/75; 396/575

[58] Field of Search ............................... 355/27–29, 40, 355/41, 43, 75, 72; 396/511, 512, 575

[56] References Cited

U.S. PATENT DOCUMENTS

| | | | |
|---|---|---|---|
| 3,012,141 | 12/1961 | Thomiszer | 250/65 |
| 3,242,316 | 3/1966 | Craskens | 219/471 |
| 3,243,579 | 3/1966 | Sussin | 219/469 |
| 3,439,905 | 4/1969 | Noble | 263/6 |
| 3,629,549 | 12/1971 | Svensen | 219/216 |
| 3,709,472 | 1/1973 | Kreitz et al. | 263/6 E |
| 3,716,018 | 2/1973 | Ohta et al. | 118/101 |
| 3,739,143 | 6/1973 | Amundson et al. | 219/216 |
| 3,781,902 | 12/1973 | Shim et al. | 346/24 |
| 3,797,127 | 3/1974 | Yamada et al. | 34/123 |
| 3,873,810 | 3/1975 | Larson | 219/535 |
| 3,934,113 | 1/1976 | Bar-on | 219/216 |
| 3,937,325 | 2/1976 | Dodge et al. | 206/387 |
| 4,172,975 | 10/1979 | Noda | 219/216 |
| 4,304,985 | 12/1981 | Miller | 219/216 |
| 4,315,682 | 2/1982 | Parzanici | 355/3 |
| 4,335,951 | 6/1982 | Scribner | 355/3 |
| 4,360,566 | 11/1982 | Shimuzu et al. | 428/404 |
| 4,387,980 | 6/1983 | Ueno et al. | 355/3 |
| 4,461,554 | 7/1984 | Norris et al. | 354/275 |
| 4,518,845 | 5/1985 | Svendsen | 219/216 |
| 4,819,032 | 4/1989 | Nagumo | 355/27 |
| 4,825,041 | 4/1989 | Nagumo et al. | 219/244 |
| 4,883,941 | 11/1989 | Martin et al. | 219/216 |
| 5,091,281 | 2/1992 | Nakamura et al. | 430/203 |
| 5,132,726 | 7/1992 | Yokota et al. | 355/100 |
| 5,151,576 | 9/1992 | Zaoralek | 219/469 |
| 5,241,159 | 8/1993 | Chatterice et al. | 219/470 |
| 5,275,347 | 1/1994 | Keeney et al. | 242/71.1 |
| 5,286,948 | 2/1994 | Landa et al. | 219/216 |
| 5,352,863 | 10/1994 | Svendsen | 219/388 |
| 5,418,593 | 5/1995 | Fyson | 354/330 |
| 5,540,809 | 7/1996 | Ida et al. | 156/584 |
| 5,544,833 | 8/1996 | Zander | 242/348 |
| 5,748,290 | 5/1998 | Nakao | 355/75 |
| 5,809,358 | 9/1998 | Weber | 396/511 |

FOREIGN PATENT DOCUMENTS

| | | |
|---|---|---|
| 0 262 833 A2 | 4/1988 | European Pat. Off. . |
| 0 500 047 A3 | 8/1992 | European Pat. Off. . |
| 0 546 190 A1 | 6/1993 | European Pat. Off. . |
| 0 605 977 A1 | 7/1994 | European Pat. Off. . |
| 0 676 677 A2 | 10/1995 | European Pat. Off. . |
| 765 175 | 6/1934 | France . |
| 1 338 102 | 8/1963 | France . |
| 59-083182 | 5/1984 | Japan . |
| 2 025 657 | 1/1980 | United Kingdom . |

OTHER PUBLICATIONS

Harris Corporation Brochure: PhotoPro™ 2000 (fold–out), Copyright 1993.

Harris Corporation Technical Brief: Laser Image Recorder Model 2000 (single sheet).

Harris Corporation Preliminary Technical Brief: Model 2500 (single sheet).

Lasertechnics, Imaging Products Division, 300D Continuous Tone Printer (4 sheets).

*Primary Examiner*—Alan A. Mathews
*Assistant Examiner*—Hung Henry Nguyen
*Attorney, Agent, or Firm*—Robert W. Sprague

[57] ABSTRACT

A film removal mechanism to aid in removing film from a thermal drum processor. The film removal mechanism includes a body having a thin, film removal edge, wherein the body extends longitudinally along the drum surface in a direction generally perpendicular to the direction of drum rotation. At least a portion of the film removal edge contacts the drum surface. A mechanism is provided for coupling the body to the thermal drum processor.

28 Claims, 5 Drawing Sheets

FILM REMOVAL MECHANISM FOR USE WITH A THERMAL DRUM PROCESSOR SYSTEM

FIELD OF THE INVENTION

The present invention relates generally to an apparatus for thermal processing a material and, in particular, a film removal mechanism to aid in removing film from a thermal drum processor.

BACKGROUND OF THE INVENTION

Light sensitive, photothermographic film is used in many applications ranging from photocopying apparatus, to graphic arts and/or medical imaging/recording printing systems. For example, in the medical industry, laser imaging systems employing photothermographic film are commonly used to produce photographic images from digital image data generated by magnetic resonance (MR) computed tomography (CT) or other types of scanners. Systems of this type typically include a laser imager for exposing the image on the photothermographic film, a thermal film processor for developing the film through the application of heat, and an image management subsystem for coordinating the operation of the laser imager and the thermal film processor. The light sensitive photothermographic film can include a thin polymer or paper base coated with an emulsion of dry silver or other heat sensitive material.

One known type of thermal processor for use in developing the photothermographic film utilizes a thermal drum processor. Once the film has been subjected to photo stimulation by optical means, such as laser light, it is fed into the thermal drum processor for development.

The thermal drum processor includes a rotating drum cylinder which is heated to develop the film. For example, the drum surface may be heated utilizing a heating element coupled to the drum, or alternatively, other methods may be used such as the rotating drum cylinder being located within an oven-like enclosure.

The film is engaged by the rotating drum and heated at a desired rate or "dwell time" to allow for development of the images on the photothermographic film. Mechanisms may be employed for holding the film against the rotating drum surface, such as through the use of a plurality of rollers positioned about the drum surface or other means, such as by electrostatically charging the drum surface, or the use of belts. After development, the film is removed from the rotating drum and cooled.

After a number of thermal processing cycles, debris and film residue are left on the thermal processing drum and its associated parts. As the debris and film residue build up on the drum surface, the film has a tendency to stick to the drum surface, and may be reluctant to separate from the drum surface after thermal processing. When the film does not adequately release from the drum surface, a film jam is typically reported, resulting in removal by the operator and/or drum maintenance.

In one thermal processing system, a guide member is employed to guide the film as it releases from the rotating drum cylinder. The guide bar is formed of a rigid metal, such as aluminum. The guide bar is spaced longitudinally across the surface of the drum in a direction generally perpendicular to the rotation of the drum. The guide bar does not contact the drum surface, being spaced a small distance (e.g., 8$^{15}/_{1000}$ of an inch) from the drum surface. During thermal processing, debris builds up on the drum surface and also condenses on the guide bar. As the gap between the guide bar and the drum surface becomes smaller, the guide bar may start to dig into the drum surface and may ultimately destroy the drum. Further, once the debris builds up on the drum surface, the film will jam requiring operator removal and/or drum maintenance and cleaning.

SUMMARY OF THE INVENTION

The present invention provides a film removal mechanism to aid in removing film from a thermal drum processor, substantially increasing the number of use cycles without a film jam. The film removal mechanism also aids in reducing and removing debris which tends to build up on the drum surface, further reducing the number of film jams between use cycles and allowing the thermal processor to operate for longer periods before scheduled maintenance, such as drum cleaning, is required.

In one embodiment, the present invention is a film removal mechanism to aid in removing film from a thermal drum processor having a rotatable drum including a drum surface, and an axis of rotation extending longitudinally therethrough. Debris tends to build up on the drum surface causing the film to have a tendency to adhere to the drum surface. The film removal mechanism includes a body having a thin, film removal edge, wherein the body extends longitudinally along the drum surface in a direction generally perpendicular to the direction of drum rotation. At least a portion of the film removal edge contacts the drum surface. A coupling mechanism is provided for attaching the body to the thermal drum processor.

Preferably the body has a width extending longitudinally along the drum surface which is greater than the width of the film. The body can be generally rectangular shaped. The film removal edge can be generally v-shaped. Other film removal edge shapes may be employed, such as a double v-shape, a plurality of notches, or a wedge/angled shape.

The film removal edge contacts the drum surface at a position which is generally tangent to the exterior drum surface or almost tangent to the exterior drum surface. Preferably, the film removal mechanism is tensioned against the drum surface. A mechanism may be provided for adjusting the tension/position of the film removal mechanism against the drum surface. In one embodiment, the film removal edge has a thickness which is less than the thickness of the film at the location where the film removal edge contacts the drum surface.

The film removal mechanism is preferably formed of a non-metallic material, such as a polymeric material. The non-metallic material is capable of withstanding temperatures greater than the temperature of the drum without changing its elastic properties. In one preferred embodiment, the film removal mechanism is constructed of a high temperature plastic commercially available under the tradename KAPTON, manufactured by DuPont Company of Wilmington, Del. Alternatively, the film removal mechanism may be constructed of a thin, flexible metallic material.

A film guide may extend longitudinally along the drum surface in a direction generally perpendicular to the direction of drum rotation. The film guide is spaced apart from the drum surface. The film removal mechanism can be coupled to the film guide. In one embodiment, the film removal mechanism is coupled to the film guide using an adhesive, such as a high temperature adhesive.

In another exemplary embodiment, the present invention is a thermal processor. The thermal processor includes a frame and cylindrical drum rotatably coupled to the frame.

The cylindrical drum includes an interior surface, an exterior surface, and a longitudinal axis extending therethrough. A mechanism is provided for rotating the cylindrical drum about the longitudinal axis relative to the frame. A heating mechanism is positioned adjacent the interior drum surface. Further, a mechanism, such as a roller system, is provided for holding a film about a portion of the exterior drum surface during rotation of the cylindrical drum. A film removal mechanism is provided in contact with the exterior drum surface wherein the film removal mechanism aids in removal of the film from the exterior drum surface. Additionally, the film removal mechanism may aid in the removal of debris which tends to build up on the exterior drum surface after repeated use of the thermal processor.

In one preferred application, the film removal mechanism extends longitudinally along the surface of the drum, and includes a generally v-shaped edge which contacts the drum surface. The film removal mechanism contacts the drum surface at a position which is generally perpendicular to the direction of rotation of the exterior drum surface. The film removal mechanism is tensioned against the exterior drum surface (which may be adjustable), and is constructed of a non-metallic material, such as a high temperature plastic. Preferably, the film removal mechanism includes a film removal edge having a thickness which is less than the thickness of the film. The film removal mechanism is coupled to the thermal processor. For example, the film removal mechanism can be coupled to a film guide positioned adjacent the thermal drum exterior surface.

BRIEF DESCRIPTION OF THE DRAWINGS

The accompanying drawings are included to provide a further understanding of the present invention and are incorporated and constitute a part of this specification. The drawings illustrate the exemplary embodiments of the present invention and together with the description, serves to explain the principles of the invention. Other objects of the present invention, and many of the intended advantages of the present invention, will be readily appreciated as the same becomes better understood by reference to the following detailed description, when considered in connection with the accompanying drawings, in which like reference numerals designate like or similar parts throughout the drawing figures and wherein.

DETAILED DESCRIPTION OF THE INVENTION

Figure 1:
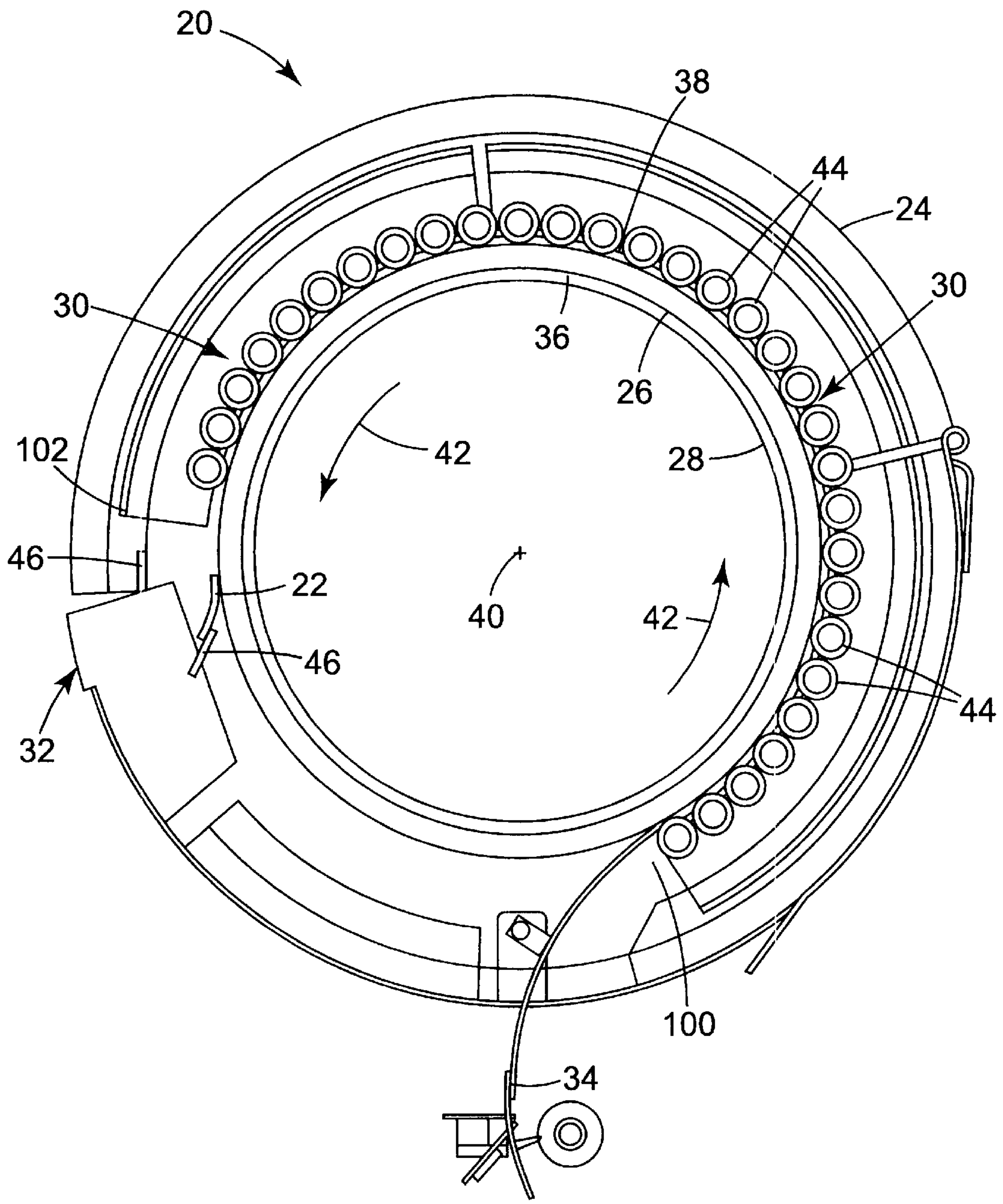
FIG. 1 is a side view illustrating an exemplary thermal drum processor having a film removal mechanism in accordance with the present invention.

In FIG. 1, a thermal drum processor 20 having a film removal mechanism 22 in accordance with the present invention is generally shown. The film removal mechanism 22 aids in removal of film from the thermal drum processor 20 after it has been developed. Additionally, the film removal mechanism 22 serves to reduce or remove debris located on the drum surface (which is bi-product of the thermal processor developing process) resulting in a reduced number of film jams and increasing the length of time between maintenance and/or drum cleaning.

Thermal drum processor 20 includes a frame 24, a cylindrical drum 26, a heating mechanism, 28, a film holding mechanism or assembly 30, a film guide assembly 32, and film removal mechanism 22. Additionally, film 34 is shown being fed into the thermal drum processor 20.

Cylindrical drum 26 is rotatably coupled to frame 24. Cylindrical drum 26 is rotated using mechanisms as known in the art (e.g. use of a motor). Cylindrical drum 26 includes an interior drum surface 36 and an exterior drum surface 38. In one preferred embodiment, cylindrical drum 26 is constructed of aluminum. Exterior drum surface 38 is coated with a material compatible with film 34, for example, silicone rubber. Heating mechanism 28 includes a heating element which is positioned about the interior drum surface 36 for uniform heating of cylindrical drum 26. In one preferred application, heating mechanism 28 uniformly heats cylindrical drum 26 to a film development temperature of 252° F. It is recognized that the desired film development temperature may vary, depending on the processing characteristics of the film.

Cylindrical drum 26 includes a longitudinal axis 40 (shown in end view) extending therethrough. In operation, a rotating mechanism, for example, a motor, rotates the cylindrical drum about the longitudinal axis 40 during operation of the thermal drum processor 20.

As film 34 is fed into thermal drum processor 20, it is positioned or held against exterior drum surface 38. In one preferred embodiment shown, film holding assembly 30 includes a plurality of pressure rollers 44. As film 34 enters the thermal drum processor 20, cylindrical drum 26 is rotating and the film 34 is grabbed by pressure rollers 44 and held firmly against the exterior drum surface 38.

After development of film 34, guide assembly 32 aids in directing film 34 along a film transport path into a cooling section for cooling of the film 34. Guide assembly 32 may include guide or mounting bar 46. Mounting bar 46 is spaced apart from exterior drum surface 38, and extends longitudinally along exterior drum surface 38 in a direction which is generally perpendicular to the direction of rotation 42 of the cylindrical drum. In one preferred embodiment, mounting bar 46 is constructed of aluminum, and is spaced $35^{40}/_{1000}$ of an inch away from exterior drum surface 38. Mounting bar 46 aids in directing film 34 away from the exterior drum surface 38 of the heated cylindrical drum 26 and toward, for example, a cooling section. One known thermal drum processor having a guide assembly including a guide bar (similar to mounting bar 46) is disclosed in U.S. patent application Ser. No. 08/239,709, filed on May 9, 1994, the entire disclosure of which is incorporated herein by reference.

The thermally processed film, for example film 34, is a photothermographic film. The photothermographic film is light sensitive, such that an image may be exposed on the photographic film using an optical process, for example, a laser imaging process. The photothermographic film is developed using a process wherein heat is applied to the film. Known light sensitive photothermographic films typically include a thin polymer or paper based coated with an emulsion of dry silver or other heat sensitive material. In one exemplary embodiment, the film is sold under the tradename DRYVIEW laser imaging film (DVB or DVC), manufactured by Imation Corp. of Oakdale, Minn.

Film removal mechanism 22 is tensioned against the exterior drum surface 38 to aid in removal of the film 34 from the drum surface. In one particular embodiment shown, film removal mechanism 22 is mechanically coupled to mounting bar 46 using an adhesive. Preferably, the adhesive is a high temperature adhesive capable of withstanding temperatures greater than the temperatures present within thermal drum processor 20 (for example, 252° F.). One suitable known adhesive is commercially available under the tradename "VHB" adhesive tape, manufactured by 3M Company of St. Paul, Minn.

The use of an adhesive for coupling film removal mechanism 22 to mounting bar 46 is preferred, since the adhesive does not interfere or damage the film 34 as it is guided away from the thermal drum processor 20. Other suitable coupling mechanisms may become apparent to those skilled in the art, for example, bolting mechanisms or clamp mechanisms, after review of this disclosure.

Figure 2:
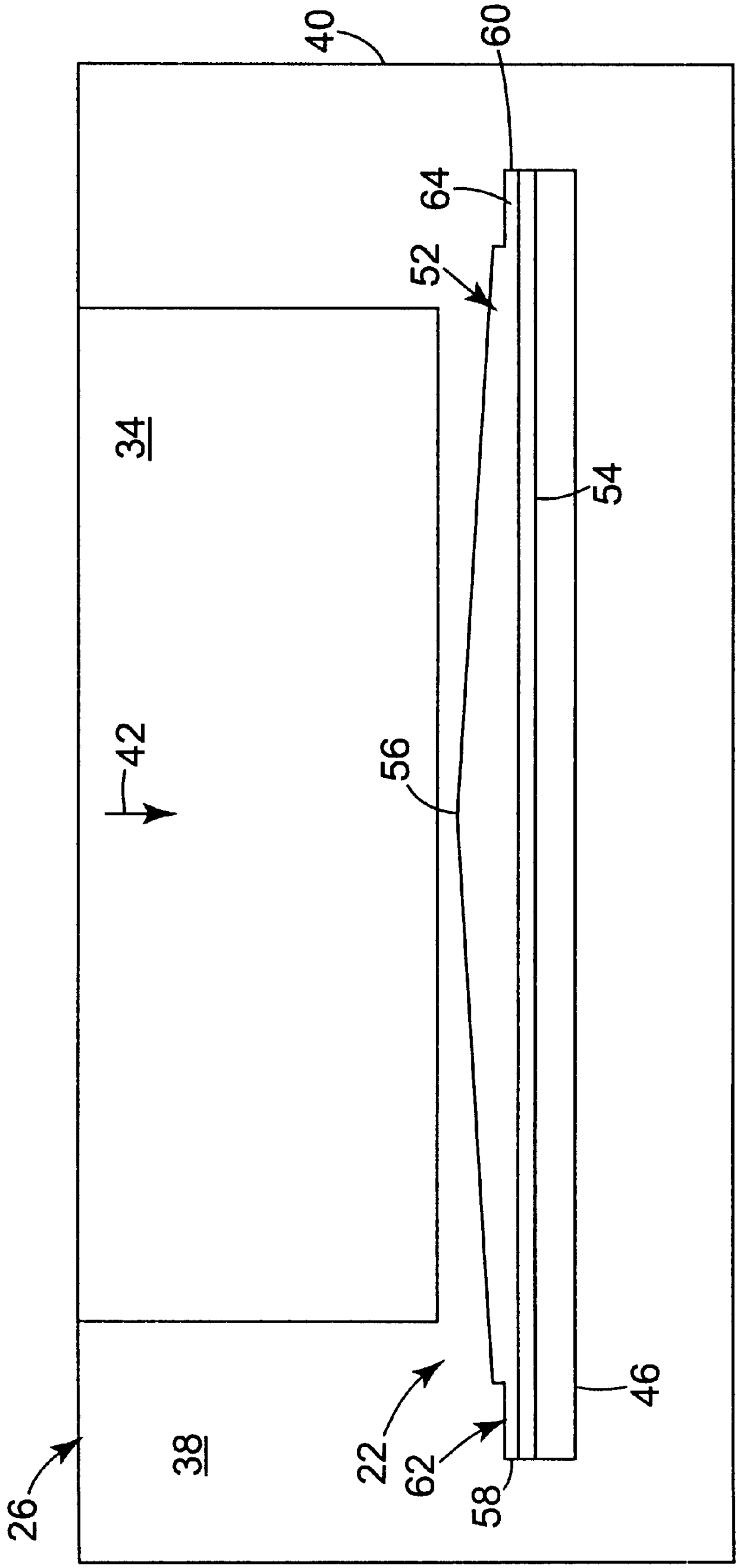
FIG. 2 is a front view illustrating an exemplary embodiment of a film removal mechanism positioned against a drum surface.

Referring to FIG. 2, a front view illustrating an exemplary embodiment of film removal mechanism 22 positioned against exterior drum surface 38 is shown. Other portions of the thermal drum processor 20 have been left out for clarity. Film removal mechanism 22 includes a film removal edge 52 and a film coupling portion 54. The film removal edge 52 is uniquely designed to aid in removal of film 34 from the exterior drum surface 38. Film coupling portion 54 is used for coupling the film removal mechanism 22 to a holder, such as mounting bar 46, using an adhesive.

It is recognized that film removal mechanism 22 may be formed of a metallic or nonmetallic material. In one preferred embodiment, film removal mechanism 22 is formed of a high temperature material, such as a high temperature polymeric material or plastic. Preferably, the film removal mechanism is capable of withstanding temperatures greater than the drum temperature without changing its elastic properties. In one exemplary embodiment, the film removal mechanism 22 is formed of a high temperature polyimide, commercially available under the tradename KAPTON, manufactured by DuPont Company of Wilmington, Del. Alternatively, it is recognized that film removal mechanism 22 may be constructed of a thin, flexible metallic material (e.g., 2 mil stainless steel).

The film removal mechanism 22 has a unique film removal edge 52 designed to maximize the ability of film removal mechanism 22 to remove the film 34 from the exterior drum surface 38. In one preferred embodiment shown, the film removal edge 52 is generally V-shaped or chevron shaped. Preferably, the film removal mechanism, and in particular, the film removal edge, is thinner than the film material which is being removed from the exterior drum surface 38. For example, in one application the film is 7 to 8 mil thick, and the film removal edge is 5 mil thick. In one preferred embodiment, the film removal mechanism 22 extends (longitudinally) across the exterior drum surface 38, in a direction perpendicular to the direction of drum rotation (42). In other embodiments, the film removal mechanism 22 extends across the exterior drum surface, but is not perpendicular to the direction of drum rotation (42). As such, the term "generally perpendicular" as used herein includes the film removal mechanism extending across the drum surface both perpendicular and angled (not perpendicular) relative to the direction of drum rotation. Preferably, the film removal mechanism 22 has a length which is longer than the width of the film. Alternatively, it is recognized that the film removal mechanism may be shorter than the width of the film. The film removal mechanism 22 has a center point 56 which tapers towards a first side edge 58 and a second side edge 60. Although the center point 56 is preferably centered on the film or drum, in other embodiments, it may be desirable for center point 56 to not be centered with respect to the film or drum. Additionally, a first relief portion 62 may be located at first side edge 58, and a second relief portion 64 may be located at second side edge 60. In operation, since film removal mechanism 22 is preferably formed of a somewhat flexible material, first relief portion 62 and second relief portion 64 have been found to aid in preventing the film removal edge 52 from buckling under towards the rotating drum surfaces.

In one preferred application for use with a 14 inch wide sheet of film, the film removal mechanism 22 is formed of a 0.005 inch thick sheet of a high temperature polyimide, commercially available under the tradename KAPTON, manufactured by DuPont Company of Wilmington, Del. having a width of 16 inches and a height at center point 56 of 0.55 inches, which tapers to a height of 0.275 inches at first edge 58 and second edge 60.

Figure 3:
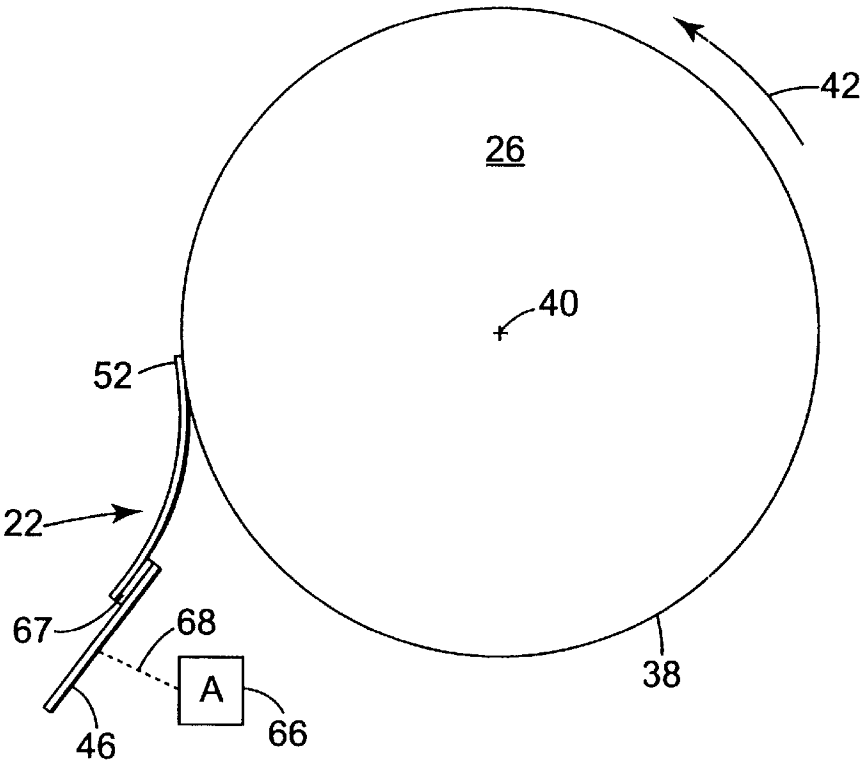
FIG. 3 is a partial side view illustrating a film removal mechanism in accordance with the present invention positioned against a drum surface.
Figure 3A:
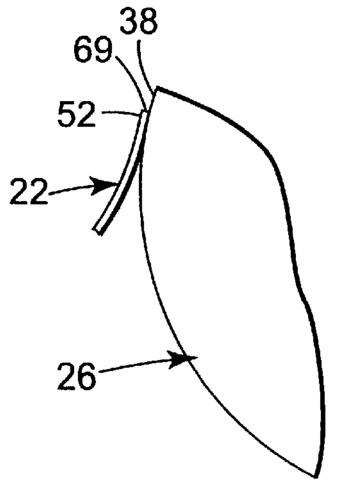
FIG. 3A is a partial side view illustrating one exemplary embodiment of a film removal mechanism in accordance with the present invention positioned against a drum surface.
Figure 3B:
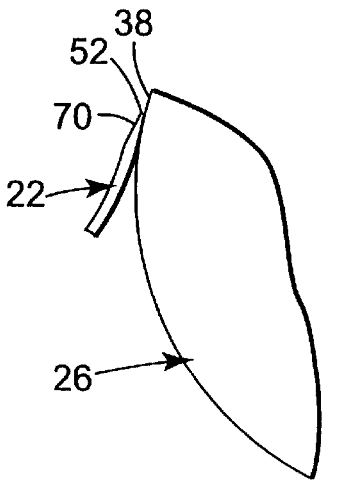
FIG. 3B is a partial side view illustrating another exemplary embodiment of a film removal mechanism in accordance with the present invention positioned against a drum surface.

In FIG. 3, a partial side view illustrating a film removal mechanism in accordance with the present invention positioned against a drum surface is shown. At least part of the film removal edge 52 must contact the exterior drum surface 38. Preferably, the film removal mechanism 22 contacts the exterior drum surface 38 along the entire length of film removal edge 52. The film removal mechanism 22 is preferably positioned such that the film removal edge 52 is tangent or slightly less than tangent to the exterior drum surface 38 along the entire length of the film removal edge. Further, the film removal mechanism 22 flexes as it is tensioned against the exterior drum surface 38. Preferably, an adjustment mechanism 66 may be provided such that the film removal mechanism 22 may be adjustably tensioned against the exterior drum surface 38. As shown, the adjustment mechanism 66 is mechanically coupled (indicated at 68) to holder or mounting bar 46. Film removal mechanism 22 is mechanically coupled to mounting bar 46, for example, by adhesive layer 67 shown. It is recognized that other holding mechanisms may be employed for holding the film removal mechanism 22 as it is tensioned against the exterior drum surface 38. Referring to FIG. 3A, it is recognized that film removal mechanism 22 may have a generally flat edge 69. Referring to FIG. 3B, it is alternatively recognized that a beveled edge 70 may be employed on either side of the film removal mechanism 22 to bring the film removal edge 52 as close as possible to the exterior drum surface 38.

Figure 4:
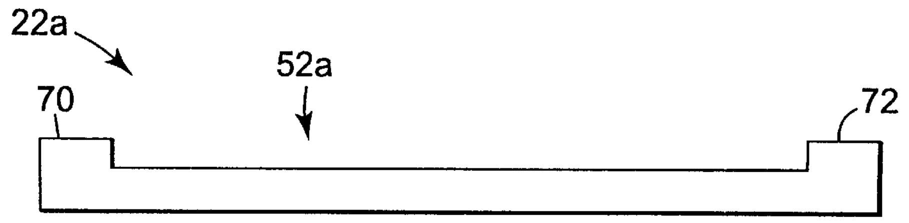
FIG. 4 is a top view illustrating another exemplary embodiment of a film removal mechanism in accordance with the present invention.
Figure 5:
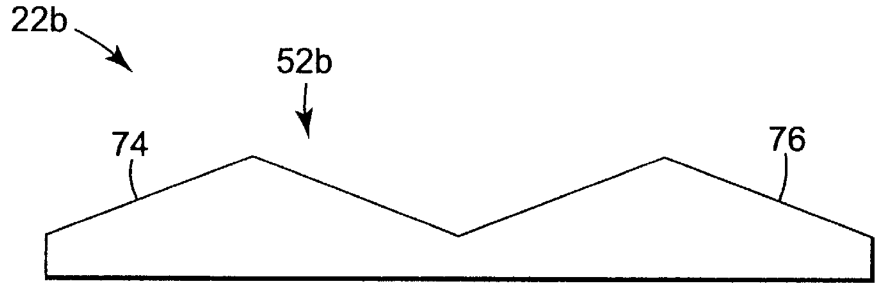
FIG. 5 is a top view illustrating another exemplary embodiment of a film removal mechanism in accordance with the present invention.
Figure 6:
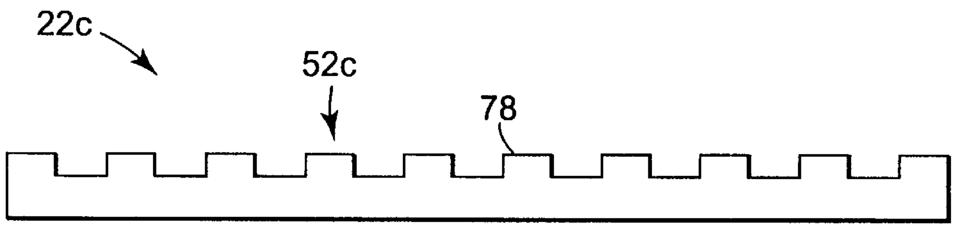
FIG. 6 is a top view illustrating yet another exemplary embodiment of a film removal mechanism in accordance with the present invention.
Figure 7:
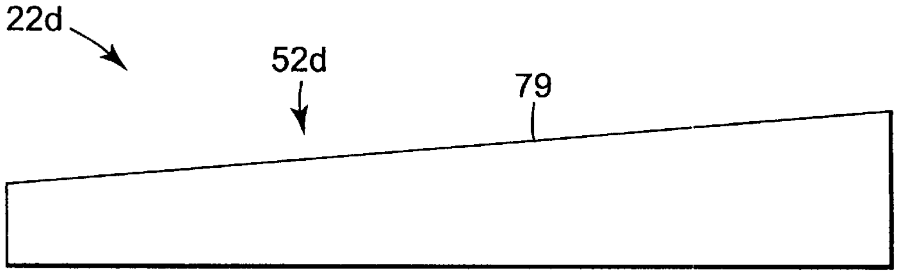
FIG. 7 is a top view illustrating yet another exemplary embodiment of a film removal mechanism in accordance with the present invention.

Referring to FIGS. 4–6, it is recognized that other designs may be employed for the film removal edge of the film removal mechanism. In FIG. 4, raised portions 70,72 are located at each end of the film removal mechanism. In FIG. 5, a double V-shaped or chevron shaped (74,76) film removal edge design is shown. In FIG. 6, film removal edge 52 has a notched design 78. In FIG. 7, film removal edge 52 has a wedge or angled design 79. After a review of this disclosure, it may become apparent to those skilled in the art that other film removal edge designs may be employed, within the scope of the present invention.

Figure 8:
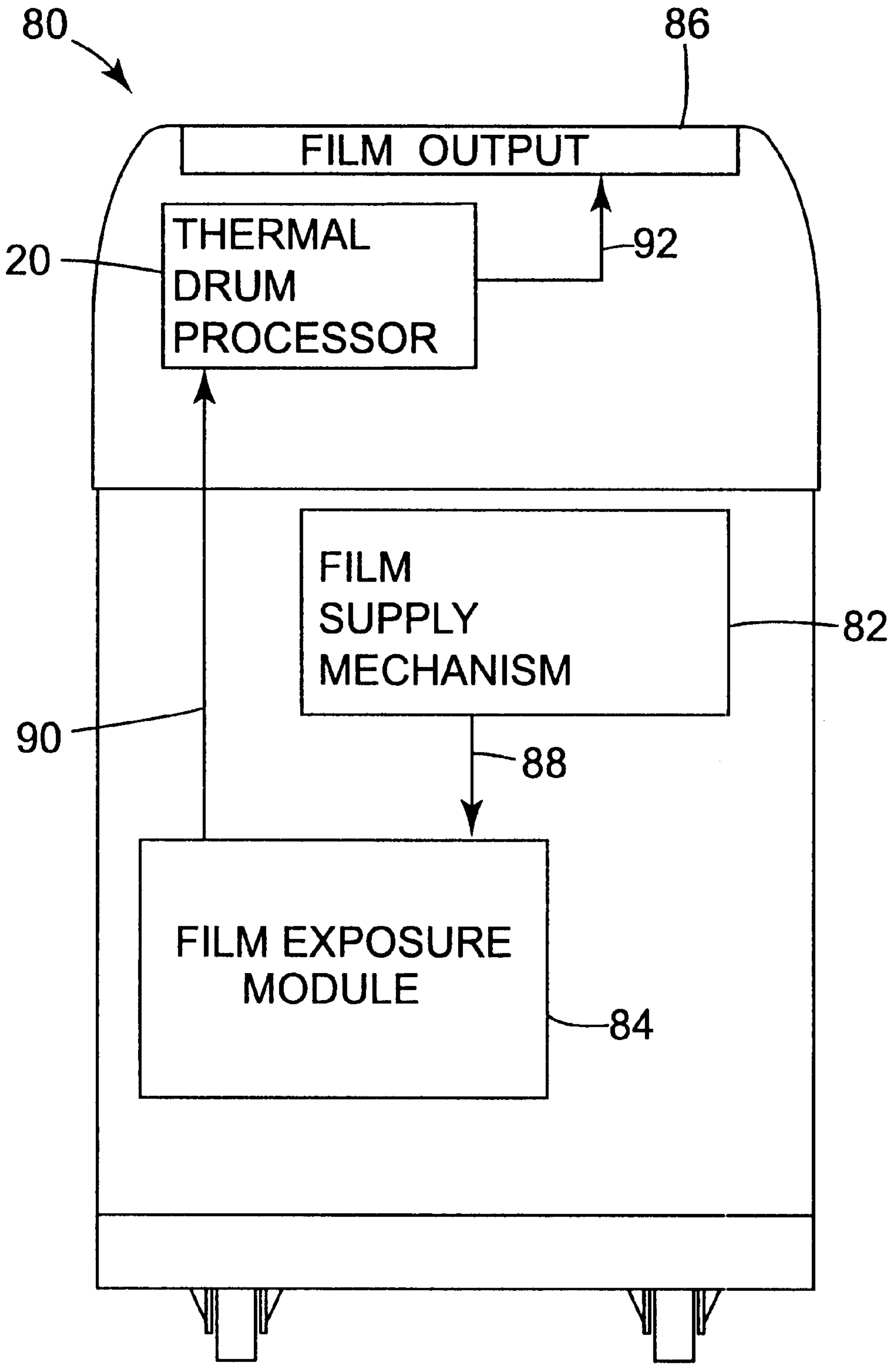
FIG. 8 is an operational block diagram illustrating an exemplary embodiment illustrating operation of a thermal drum processor having a film removal mechanism, used in a laser imaging system.

Beginning with FIG. 8, the operation of one exemplary embodiment of a thermal drum processor having a film removal mechanism as used in a laser imaging system will be described herein. Laser imaging system 80 includes film supply mechanism 82, film exposure module 84, thermal drum processor 20, and film output 86. A sheet of film, for example, thermal photographic film 34, is fed into film exposure module 84 (indicated at 88). Within film exposure module 84, photographic images are exposed on the film from image data (e.g., digital or analog), using a laser imager. The exposed film is transported to thermal drum processor 20, indicated at 90. After thermal processing, the film is cooled and transported to film output 86, indicated at 92.

Referring again to FIG. 1, within thermal drum processor 20, film 34 is engaged by rotating cylindrical drum 26 (indicated at position 100). Film holding assembly 30 restrains or holds the film against the exterior drum surface 38 as the drum rotates. Heating mechanism 28 heats the cylindrical drum 26 to a desired film developing temperature, (which, in one embodiment, is 252° F.) as the film 34 rides on drum 26 for a sufficient processing or "dwell time" to develop the exposed images present on the film. In one embodiment, the film processing time is approximately 15 seconds.

After the film leaves the film holding assembly 30 (past the last roller), indicated at position 102, air flows exist through the thermal drum processor 20 such that the film 34 begins to cool down and will have a natural tendency to lift off of the exterior drum surface 38.

As previously described herein, after repeated thermal drum processing cycles, debris and film residue build up on the exterior drum surface 38, and the film 34 has a tendency to stick to the exterior drum surface 38. As such, the film 34 may be reluctant to separate from the exterior drum surface 38 after thermal processing. Film removal mechanism 22 is located proximate to position 102 to aid in removing film 34 from the exterior drum surface 38.

Referring also to FIG. 2 and FIG. 3, film 34 first contacts the film removal mechanism 22 at center point 56, and peels the film away from the exterior drum surface 38 as it continues to move forward and contact the tapered film removal edge 52, without causing damage to the exposed images on the film. As the film removal mechanism 22 continues to lift the film 34 away from the exterior drum surface 38, film 34 is guided, such as by guide assembly 32, to a subsequent section within imager 80 for cooling.

Film removal mechanism 22 is also useful in reducing the amount of residue and debris which builds up on the exterior drum surface 38 after repeated thermal processing use cycles. The film removal mechanism film removal edge 52 is in continuous contact with the exterior drum surface 38, even when a film is not being removed from the drum surface. As such, the film removal edge 52 tends to scrape away debris and film residue located on the exterior drum surface. As previously described herein, such debris and film residue builds up on the exterior drum surface over time, which may cause film jams and requires periodic maintenance, including drum cleaning. With the use of film removal mechanism 22, the number of thermal processing use cycles may be substantially increased before cleaning of the drum is required. Further, even though the film removal mechanism continuously contacts the exterior drum surface, it does not harm or damage the drum surface.

It will be understood, however, that this disclosure is, in many respects, only illustrative. Changes may be made in details, particularly in matters of shape, size, and arrangement of parts without exceeding the scope of the invention. The inventions's scope is, of course, defined in the language in which the appended claims are expressed.

What is claimed is:

1. A film removal mechanism to aid in removing film from a thermal drum processor having a rotatable drum including a drum surface and an axis of rotation extending longitudinally therethrough, wherein debris tends to build up on the drum surface causing the film to have a tendency to adhere to the drum surface, the mechanism comprising:

a body having a thin, film removal edge, wherein the body extends longitudinally along the drum surface in a direction generally perpendicular to the direction of drum rotation, wherein at least a portion of the film removal edge contacts the drum surface and wherein the body has a length which is longer than the width of the film; and a coupling mechanism for attaching the body to the thermal drum processor.

2. The mechanism of claim 1, wherein the body has a width extending longitudinally along the drum surface which is greater than the width of the film.

3. The mechanism of claim 1, wherein the body is rectangular shaped.

4. The mechanism of claim 1, wherein the film removal edge is v-shaped.

5. The mechanism of claim 1, wherein the film removal edge is double-v shaped.

6. The mechanism of claim 1, wherein the film removal edge includes a plurality of notches.

7. The mechanism of claim 1, wherein the film removal edge contacts the drum surface at a position which is tangent to the exterior drum surface.

8. The thermal processor of claim 1, wherein the film removal mechanism contacts the drum surface at a position which is tangent to the exterior drum surface.

9. The mechanism of claim 1, wherein the film removal mechanism is tensioned against the exterior drum surface.

10. The mechanism of claim 1, wherein the film removal edge is beveled.

11. The mechanism of claim 1, wherein the film removal mechanism is formed of a flexible metallic material.

12. The mechanism of claim 1, wherein the film removal mechanism is formed of a nonmetallic material.

13. The mechanism of claim 1, wherein the removal mechanism is formed of a polymeric material.

14. The mechanism of claim 13, wherein the polymeric material is capable of withstanding temperatures greater than a temperature of the drum without changing its elastic properties.

15. The mechanism of claim 13, wherein the film removal mechanism is constructed of a high temperature polyimide.

16. The mechanism of claim 1, further comprising a film guide assembly spaced adjacent the drum surface and extending longitudinally along the drum surface in a direction generally perpendicular to the direction of drum rotation.

17. The mechanism of claim 16, wherein the film removal mechanism is coupled to the film guide assembly.

18. The thermal processor of claim 17, wherein the film removal mechanism is coupled to a mounting bar on the film guide assembly using an adhesive.

19. The thermal processor of claim 18, wherein the adhesive is a high temperature adhesive.

20. The thermal processor of claim 1, wherein the film removal edge has a thickness which is less than the thickness of the film at the location where it contacts the drum surface.

21. A film removal mechanism to aid in removing film from a thermal drum processor having a rotatable drum including a drum surface and an axis of rotation extending longitudinally therethrough, wherein debris tends to build up on the drum surface causing the film to have a tendency to adhere to the drum surface, the mechanism comprising:

a flexible body having a film removal edge, wherein the body extends along the drum surface in a direction generally perpendicular to the direction of drum rotation, and wherein the body has a length which is longer than the width of the film; and a coupling mechanism for attaching the body to the thermal drum processor.

22. The mechanism of claim 21, wherein the body has a width extending longitudinally along the drum surface which is greater than the width of the film.

23. The mechanism of claim 21, wherein the body has a width extending longitudinally along the drum surface which is shorter than the width of the film.

24. The mechanism of claim 21, wherein the film removal adge is v-shaped.

25. The mechanism of claim 21, wherein the removal mechanism is formed of a polymeric material.

26. The mechanism of claim 25, wherein the polymeric material is capable of withstanding temperatures greater than a temperature of the drum without changing its elastic properties.

27. The mechanism of claim 25, wherein the film removal mechanism is constructed of a high temperature polyimide.

28. The thermal processor of claim 21, wherein the distance from the film removal edge to the drum surface is less than the thickness of the film at the location where it contacts the drum surface.

* * * * *